United States Patent [19]

Schmidlin et al.

[11] Patent Number: 4,743,926

[45] Date of Patent: May 10, 1988

[54] DIRECT ELECTROSTATIC PRINTING APPARATUS AND TONER/DEVELOPER DELIVERY SYSTEM THEREFOR

[75] Inventors: Fred W. Schmidlin, Pittsford; Nero R. Lindblad, Ontario, both of N.Y.

[73] Assignee: Xerox Corporation, Stamford, Conn.

[21] Appl. No.: 946,937

[22] Filed: Dec. 29, 1986

[51] Int. Cl.[4] .............................................. G01D 15/10

[52] U.S. Cl. .................................. 346/159; 346/160.1

[58] Field of Search .................. 346/153.1, 159, 160.1; 358/300; 355/3 DD, 3 CH; 101/DIG. 13; 400/119

[56] References Cited

U.S. PATENT DOCUMENTS

| | | | |
|---|---|---|---|
| 3,689,935 | 9/1972 | Pressman et al. | 346/74 |
| 3,778,678 | 12/1973 | Masuda | 317/3 |
| 3,801,869 | 4/1974 | Masuda | 317/3 |
| 3,872,361 | 3/1975 | Masuda | 317/262 |
| 4,480,911 | 11/1984 | Itaya et al. | 355/3 DD |
| 4,491,855 | 1/1985 | Fujii et al. | 346/159 |
| 4,538,163 | 8/1985 | Sheridon | 346/159 |
| 4,568,955 | 2/1986 | Hosoya et al. | 346/153 |

*Primary Examiner*—A. Evans

[57] ABSTRACT

Electrostatic printing apparatus including structure for delivering developer or toner particles to a printhead forming an integral part of the printing device. Alternatively, the toner particles can be delivered to a charge retentive surface containing latent images. The developer or toner delivery system is adapted to deliver toner containing a minimum quantity of wrong sign and size toner. To this end, the developer delivery system includes a pair of charged toner conveyors which are supported in face-to-face relation. A bias voltage is applied across the two conveyors to cause toner of one charge polarity to be attracted to one of the conveyors while toner of the opposite is attracted to the other conveyor.

In another embodiment, a single charged toner conveyor is supplied by a pair of three-phase generators which are biased by a dc source which causes toner of one polarity to travel in one direction on the electrode array while toner of the opposite polarity travels generally in the opposite direction.

In additional embodiments of the invention, a toner charging device is provided which charges uncharged toner particles to a level sufficient for movement by one or the other of the aforementioned charged toner conveyors.

13 Claims, 3 Drawing Sheets

DIRECT ELECTROSTATIC PRINTING APPARATUS AND TONER/DEVELOPER DELIVERY SYSTEM THEREFOR

BACKGROUND OF THE INVENTION

This invention relates to a printing devices and more particularly to a developer or toner delivery system for presenting developer or toner to a charge retentive surface or an electronically addressable printhead utilized for depositing developer in image configuration on plain paper substrates.

Of the various electrostatic printing techniques, the most familiar is that of xerography wherein latent electrostatic images formed on a charge retentive surface are developed by a suitable toner material to render the images visible, the images being subsequently transferred to plain paper.

A less familiar form of electrostatic printing is what has come to be known as direct electrostatic printing (DEP). This form of printing differs from the aforementioned xerographic form, in that, the toner or developing material is deposited directly onto a plain (i.e. not specially treated) copy substrate in image configuration. This type of printing device is disclosed in U.S. Pat. No. 3,689,935 issued Sept. 5, 1972 to Gerald L. Pressman et al.

In xerographic printing systems, the latent images on a charge retentive surface can be rendered visible by the use of magnetic and fiber brushes, the former of which results in toner being presented to the charge retentive surface which has a fairly good charge distribution but toner particles having a low charge level are not avoided. The problem of charge distribution of the toner and the charge level has been addressed in copending application U.S. Ser. No. 926,169 assigned to the same assignee as this application. As disclosed therein, a developer or toner delivery system disposed to one side of a printhead includes a conventional magnetic brush supported for rotation adjacent a supply of developer contained in a hopper.

A developer donor roll is supported for rotation intermediate the magnetic brush and the printhead structure. The donor roll structure is spaced from the printhead approximately 0.006 inch. The magnetic brush has a DC bias of about 100 volts applied thereto via a DC voltage source. An AC voltage of about 400 volts is applied to the donor roll creates a localized field between the donor roll and the printhead causing toner to jump to the vicinity of apertures in the printhead.

Traveling wave devices have been employed for delivering particulate material to a charge retentive surface, for example, U.S. Pat. No. 3,872,361 issued to Masuda which discloses an apparatus in which the flow of particulate material along a defined path is controlled electrodynamically by means of elongated electrodes curved concentrically to a path, as axially spaced rings or interwound spirals. Each electrode is axially spaced from its neighbors by a distance about equal to its diameter and is connected with one terminal of a multi-phase alternating high voltage source. Adjacent electrodes along the path are conncted with different terminals in a regular sequence, producing a wave-like, non-uniform electric field that repels electrically charged particles axially inwardly and tends to propel them along the path.

U.S. Pat. No. 3,778,678 also issued to Masuda relates to a similar device as that disclosed in the aforementioned U.S. Pat. No. 3,872,361.

U.S. Pat. No. 3,801,869 issued to Masuda discloses a booth in which electrically charged particulate material is sprayed onto a workpiece having an opposite charge, so that the particles are electrostatically attracted to the workpiece. All of the walls that confront the workpiece are made of electrically insulating material. A gridlike arrangement of parallel, spaced apart electrodes, insulated from each other extends across the entire area of every wall, parallel to a surface of the wall and in intimate juxtaposition thereto. Each electrode is connected with one terminal of an alternating high voltage source, every electrode with a different terminal than each of the electrodes laterally adjacent to it, to produce a constantly varying field that electrodynamically repels particles from the wall. While the primary purpose of the device disclosed is for powder painting, it is contended therein that it can be used for electrostatic printing.

The Masuda devices all utilize a relatively high voltage source (i.e. 5–10 KV) operated at a relatively low frequency, i.e. 50 Hz, for generating his traveling waves. Another commonality among the Masuda et al devices is the nonrecognition of the problem caused by toner with a wide charge distribution.

The movement of toner via traveling waves for use in a xerographic development system is also disclosed in U.S. patent application Ser. No. 374,376 filed on May 3, 1982, now abandoned. In that application, there is disclosed a device comprising an elongated conduit which utilizes traveling waves for transporting toner from a supply bottle to a toner hopper.

The performance of xerographic printing systems based on electrostatic monopole force, broadly referred to as Charged Pigment Xerography (CPX), is strongly dependent on the distribution of charge on the toner and especially requires the avoidance of low (i.e. has the opposite sign from the electrostatic image) and wrong sign toner (i.e. toner that is charged to the same sign as the image to be developed) The performance of direct electrostatic printing systems also have the foregoing requirements.

Direct electrostatic printers are known in the art. For example, Pressman et al in U.S. Pat. No. 3,689,935 disclose an electrostatic line printer incorporating a multilayered particle modulator or printhead comprising a layer of insulating material, a continuous layer of conducting material on one side of the insulating layer and a segmented layer of conducting material on the other side of the insulating layer. At least one row of apertures is formed through the multilayered particle modulator. Each segment of the segmented layer of the conductive material is formed around a portion of an aperture and is insulatively isolated from every other segment of the segmented conductive layer. Selected potentials are applied to each of the segments of the segmented conductive layer while a fixed potential is applied to the continuous conductive layer.

An overall applied field projects charged particles through the row of apertures of the particle modulator and the density of the particle stream is modulated according to the the pattern of potentials applied to the segments of the segmented conductive layer. The modulated stream of charged particles impinge upon a print-receiving medium interposed in the modulated particle stream and translated relative to the particle modulator to provide line-by-line scan printing. In the Pressman et al device, the supply of the toner to the control member is not uniformly effected and irregularities are liable to occur in the image on the image receiving member. High-speed recording is difficult and moreover, the openings in the printhead are liable to be clogged by the toner. For these reasons, this method has not yet been put into practical use.

U.S. Pat. No. 4,491,855 issued on Jan. 1, 1985 in the name of Fujii, et al discloses a method and apparatus utilizing a controller having a plurality of openings or slit-like openings to control the passage of charged particles and to record a visible image by the charged particles directly on an image receiving member. Specifically disclosed therein is an improved device for supplying the charged particles to a control electrode and has made high-speed and stable recording possible. The improvement in Fujii et al lies in that the charged particles are supported on a supporting member and an alternating electric field is applied between the supporting member and the control electrode. Thus, as alleged therein, it has become possible to sufficiently supply the charged particles to the control electrode without scattering them.

U.S. Pat. No. 4,568,955 issued on Feb. 4, 1986 to Hosoya et al discloses a recording apparatus wherein a visible image based on image information is formed on an ordinary sheet by a developer. The recording apparatus comprises a developing roller spaced at a predetermined distance from and facing the ordinary sheet and carrying the developer thereon, a recording electrode and a signal source connected thereto, for propelling the developer on the developing roller to the ordinary sheet by generating an electric field between the ordinary sheet and the developing roller according to the image information, a plurality of mutually insulated electrodes provided on the developing roller and extending therefrom in one direction, an AC and a DC source are connected to the electrodes, for generating an alternating electric field between adjacent ones of the electrodes to cause oscillations of the developer found between the adjacent electrodes along electric lines of force therebetween to thereby liberate the developer from the developing roller. In a modified form of the Hosoya et al device, a toner reservoir is disposed beneath a recording electrode which has a top provided with an opening facing the recording electrode and an inclined bottom for holding a quantity of toner. In the toner reservoir are disposed a toner carrying plate as the developer carrying member, secured in a position such that it faces the end of the recording electrode at a predetermined distance therefrom, and a toner agitator for agitating the toner.

The toner carrying plate is made of an insulator. The toner carrying plate has a horizontal portion, a vertical portion descending from the right end of the horizontal portion and an inclined portion downwardly inclining from the left end of the horizontal portion. The lower end of the inclined portion is found near the lower end of the inclined bottom of the toner reservoir and immersed in the toner therein. The lower end of the vertical portion is found near the upper end of the inclined portion and about the toner in the reservoir.

The surface of the toner carrying plate is provided with a plurality of uniformly spaced parallel linear electrodes extending in the width direction of the toner carrying plate. At least three AC voltages of different phases are applied to the electrodes. The three-phase AC voltage source provides three-phase AC voltages 120 degrees out of phase from one another. The terminals are connected to the electrodes in such a manner that when the three-phase AC voltages are applied, a propagating alternating electric field is generated, which propagates along the surface of the toner carrying plate from the inclined portion to the horizontal portion.

The toner which is always present on the surface of lower end of the inclined portion of the toner carrying plate is negatively charged by friction with the surface of the toner carrying plate and by the agitator. When the propagating alternating electric field is generated by the three-phase AC voltages applied to the electrodes the toner is transported up the inclined portion of the toner carrying plate while it is oscillated and liberated to be rendered into the form of smoke between adjacent linear electrodes. Eventually, it reaches the horizontal portion and proceeds. When it reaches a development zone facing the recording electrode it is supplied through the opening to the ordinary sheet as recording medium, whereby a visible image is formed. The toner which has not contributed to the formation of the visible image, is carried along such as to fall along the vertical portion and then slide down into the bottom of the toner reservoir by the gravitational force to return to a zone, in which the lower end of the inclined portion of the toner.

Notwithstanding the advancements made in direct electrostatic printing, there is still need for improvement in the quality of the toner delivered to the substrate on which the images are formed. Specifically, a delivery system capable of delivering a high percentage of well charged (i.e. greater than 1 micron/gm) toner of the proper sign is highly desirable.

It is known to remove contaminants such as debris prior to the use of the developer for its intended purpose. Such an arrangement is disclosed in U.S. patent application Ser. No. 718,615, now U.S. Pat. No. 4,639,115 wherein a biased roller is disposed in the developer housing at a location suitable for removing debris such as paper fibers from the toner prior to use for developing the images. The foregoing application does not involve the type of printing herein contemplated nor does it suggest the type of toner delivery system disclosed and claimed herein. Its relevance is the altering of the composition of the toner by removing contaminants from the developer prior to image development.

It is also known to separate low charge residual toner from toner charged to the desired level. Such is disclosed in a residual toner removal apparatus in U.S. patent application Ser. No. 563,729. In that application a cylindrically shaped member comprising an electrostatic wave transport is adapted to move toner larger than a predetermined size and having a predetermined charge level along its longitudinal axis.

A charged toner conveyor is disclosed in copending U.S. patent application Ser. No. 614,499, now U.S. Pat. No. 4,647,179 field in the name of Fred Schmidlin on May 29, 1984 which application is assigned to the same assignee as the instant application. The device disclosed therein differs from the U.S. patent application Ser. No. 563,729 in that, toner separation is not effected

BRIEF DESCRIPTION OF THE INVENTION

The present invention provides a developer or toner delivery system which separates a quantity of toner into its positive and negative components and which transports or delivers toner which has a high percentage of a predetermined charge level and sign to the development zone. In a charged toner conveyor of the type disclosed in the U.S. patent application Ser. No. 614,499 toner of sufficient absolute charge is transported via a traveling electrostatic wave pattern with the positive toner being moved along the direction of wave motion by the tangential electric field pointed in the same direction. The negative toner is also moved along in the same direction by a reversed electric field a half wave later or earlier.

In order to separate the positive and negative toner there is provided in one embodiment of the present invention, two charged toner conveyors similar in function to the one described in the aforementioned Schmidlin application. They are supported partially opposite each other in a face-to-face relationship and are electrically biased to the opposite polarity. With this arrangement of the two charged toner conveyors, toner of one polarity is attracted to one of the conveyors while toner of the other polarity is attracted to the other conveyor. Toner of one polarity can be delivered to the development zone while the toner of the other polarity can be delivered to a toner waste container or to the developer housing.

In a another embodiment of our invention, the toner is separated into its positive and negative components by superimposing a uniform field perpendicular to the wave motion (parallel to the grid wires which have a relatively high resistance). One way of achieving the foregoing cross field arrangement is to provide connections on both ends of a charged toner conveyor containing resistive grid wires. Two biased, 3-phase generators are employed such that their average potentials provide DC tangential fields which will move the toner of opposite signs in opposite directions on the conveyor. We refer to this embodiment as a cross-field separator while the first described embodiment is referred to as simply a transfer separator.

In still another embodiment of our invention we use either the transfer separator or the cross-field separator with initially uncharged toner which is charged by a toner charging system having no moving parts. To this end, in one embodiment, uncharged toner is dispensed onto a high voltage charged toner conveyor which transports it to a low voltage, combination transport and separator or a cross-field separator. The uncharged toner can also be charged by depositing ions from an ion source.

DETAILED DESCRIPTION OF THE DRAWINGS

DESCRIPTION OF THE PREFERRED EMBODIMENT OF THE INVENTION

Figure 1:
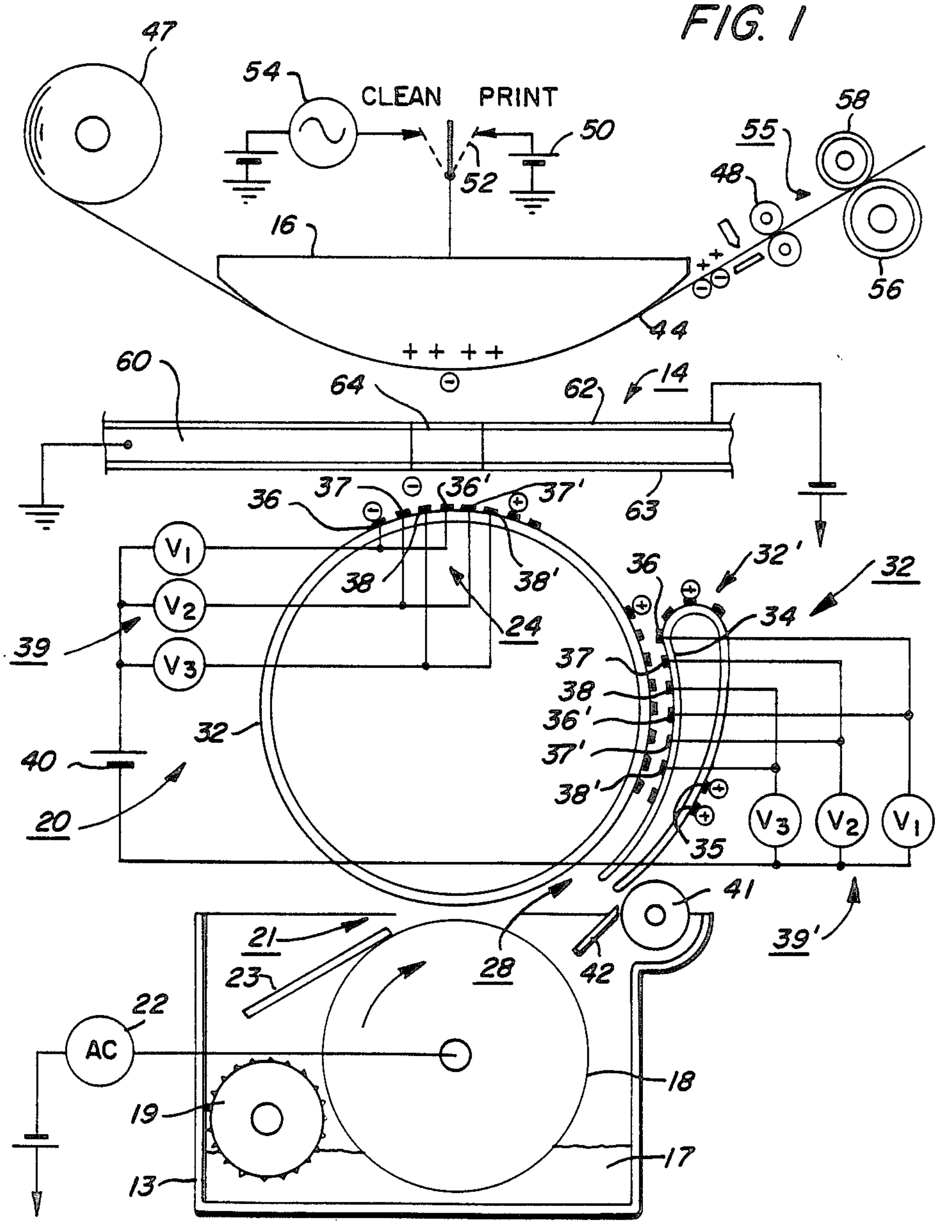
FIG. 1 is a schematic illustration of a printing apparatus representing the present invention.

Disclosed in FIG. 1 is an embodiment of a direct electrostatic printing apparatus 10 representing the invention.

The printing apparatus 10 includes a developer delivery system generally indicated by reference character 12, a printhead structure 14 and and a backing electrode or shoe 16. While the toner delivery system of the present invention is disclosed in connection with a direct electrostatic printer its use is not so limited. For example, it can also be utilized in a conventional xerographic copier or printer for delivering toner to a charge retentive surface having electrostatic images thereon.

The toner delivery system 12 comprises a sump 13 containing a quantity of charged nonmagnetic toner 17. A nonmagnetic donor roll 18 and a preloader roller 19 are provided for moving toner from the sump to a stationarily mounted toner conveyor 20. The preloader roll is preferably fabricated from soft rubber and is provided with a ribbed surface for effecting preloading of the donor roll thereby. The nonmagnetic roll 18 is rotatably supported and is provided with a DC biased AC power source 22 which causes the toner to be jumped from the roll 18 to the conveyor 20 across the gap 21 therebetween. A metering blade structure 23 is supported for wiping contact with the roll 18 and is thereby effective to both meter the toner to the desired thickness and charge charge it.

The conveyor 20 forms one member of a charged toner separator 24 while a conveyor 26 forms the other member. The charged toner conveyors 20 and 26 are supported in face-to-face relation over a portion of their extent as indicated at 28. The conveyor 20 includes a base member 30 on which there is carried an electrode array generally indicated by reference numeral 32 and preferably has a generally cylindrical shape. The conveyor 26 includes a arcuate shaped base member 34 having a plurality of electrodes on the surface thereof forming a second electrode array 35.

Each conveyor is utilized to transport only one polarity of toner particles delivered to the conveyor 20 via the nonmagnetic donor roll 18. To this end the electrode array 24 preferably comprises a three-phase grid structure comprising repeating groups of electrodes 36, 37 and 38 having a three-phase AC voltage source 39 operatively connected thereto for applying a voltage in the order of 30–1000 volts AC. The electrode array 32 preferably comprises a three-phase grid structure comprising repeating groups of electrodes $\mathbf{36^1}$, $\mathbf{37^1}$ and $\mathbf{38^1}$ having a three-phase AC voltage source $\mathbf{39^1}$ operatively connected thereto for applying a voltage in the order of 3–1000 volts AC.

The electrodes are connected to the AC voltage sources via phase shifting circuitry (not shown) which is similar to that disclosed in the U.S. patent application Ser. No. 614,499 such that a traveling wave pattern is established. The AC voltage sources 39 and $\mathbf{39^1}$ are interconnected by a DC voltage source 40 which serves to create an electrostatic field between the two conveyors 20 and 26 which causes toner of one polarity to be attracted to the conveyor 20 while toner of the opposite polarity is attracted to the conveyor 26.

The electrostatic field forming the traveling wave pattern of the conveyor 20 pushed the charged toner particles of one polarity along the surface of the conveyor 20 to the printhead 14. Toner particles of the other polarity are pushed along the conveyor 26 and are returned to the sump 13. Toner particles moved by the conveyor 26 are attracted to a biased roll 41 and scraped therefrom by a scraper blade 42.

A typical width for each of the electrodes is 1 to 4 mils. Typical spacing between the centers of the electrodes is twice the electrode width and the spacing between adjacent electrodes is approximately the same as the electrode width. Typical operating frequency is between 1000 and 10,000 Hz for 125 lpi grids (4 mil electrodes), the drive frequency for maximum transport rate being 2,000 Hz.

While the electrodes may be exposed metal such as Cu or Al it is preferred that they be covered or overcoated with a thin oxide or insulator layer. A thin coating having a thickness of about half the electrode width will sufficiently attenuate the higher harmonic frequencies and suppress attraction to the electrode edges by polarization forces. A slightly conductive overcoating will allow for the relaxation of charge accumulation due to charge exchange with the toner. To avoid excessive alteration of the toner charge as it moves about the conveyor, however, a thin coating of a material which is non-tribo active with respect to the toner is desirable. A weakly tribo-active material which maintains the desired charge level may also be utilized.

A preferred overcoating layer comprises a strongly injecting active matrix such as that disclosed in U.S. patent application Ser. No. 567,840 filed in the U.S. Patent Office in the name of Joseph Mammino et al on or about Dec. 30, 1983 and assigned to the same assignee as the instant application. As disclosed therein, the layer comprises an insulating film forming contiuous phase comprising charge transport molecules and finely divided charge injection enabling particles dispersed in the continuous phase. A polyvinylfluoride film available from the E. I. duPont de Nemours and Company under the tradename Tedlar has also been found to be suitable for use as the overcoat.

The printhead structure 14 comprises a layered member including an electrically insulative base member 60 fabricated from a polyimide film approximately 0.001 inch thick. The base member is clad on the one side thereof with a continuous conductive layer or shield 62 of aluminum which is approximately one micro thick. The opposite side of the base member 60 carries segmented conductive layer 63 thereon which is fabricated from aluminum. A plurality of holes or apertures 64 (only one of which is shown) approximately 0.007 inch in diameter are provided in the layered structure in a pattern suitable for use in recording information. The apertures form an electrode array of individually addressable electrodes. With the shield grounded or biased at a low negative voltage and a negative 350 volts applied to an addressable electrode toner is prevented from being propelled through the aperture defined by that electrode. With zero volts applied to an addressable electrode toner is propelled through the aperture. Image intensity can be varied by adjusting the voltage on the shield and control electrodes between 0 and minus 350 volts. Addressing of the individual electrodes can be effected in any manner known in the art of printing using electronically addressable printing elements.

The electrode or shoe 16 has an arcuate shape as shown but as will be appreciated the present invention is not limited to such a configuration. The shoe which is positioned on the opposite side of a plain paper recording medium 44 from the printhead deflects the recording medium in order to provide an extended area of contact between the medium and the shoe.

The recording medium 44 may comprise cut sheets of paper or as shown herein it can comprise a web of plain paper which is spaced about 0.005 inch from the printhead 14. The web which may be contained in supply roll 47 is transported in contact with the shoe 16 via edge transport rolls 48.

During printing the shoe 16 is electrically biased to a DC potential of approximately 400 volts via a dc voltage source 50.

Periodically, a switch 52 is actuated such that a DC biased AC power supply 54 is connected to the the shoe 16 to effect cleaning of the printhead.

Momentum transfer between the oscillating toner and any toner on the control electrodes of the printhead causes the toner on the control electrodes to become dislodged. The toner so dislodged is deposited on the copy substrate or medium 44 along with toner transferred through the apertures during the printing process.

The fusing station includes a fuser assembly, indicated generally by the reference numeral 55, which permanently affixed the transferred toner powder images to substrate 44. Preferably, fuser assembly 55 includes a heated fuser roller 56 adapted to be pressure engaged with a back-up roller 58 with the toner powder images contacting fuser roller 56. In this manner, the toner powder image is permanently affixed to substrate 44. After fusing, a chute, not shown guides the substrate 44 to a catch tray, also not shown, for removal from the printing machine by the operator.

Figure 2:
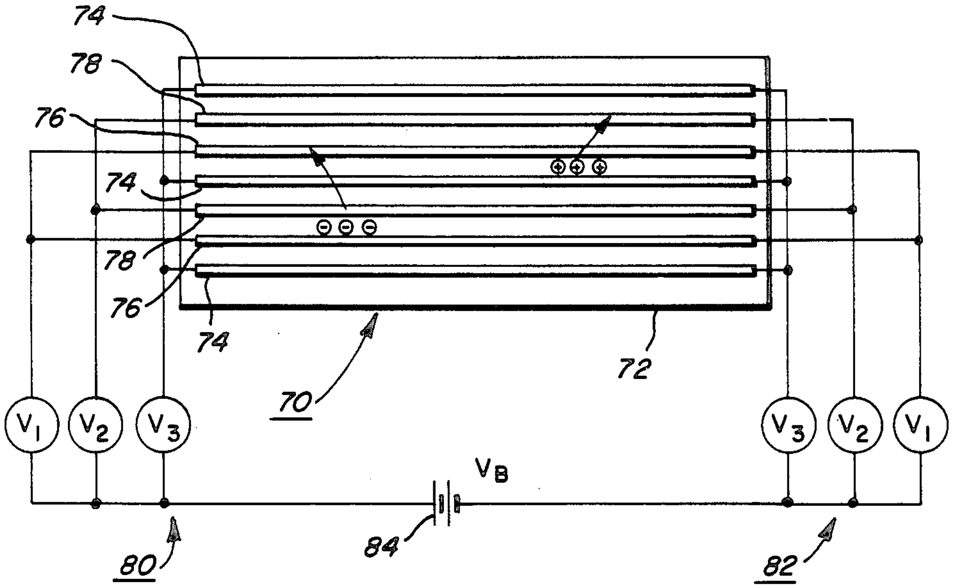
FIG. 2 is schematic representation of a modified charged toner separator from that disclosed in FIG. 1.

The modified embodiment of the toner separator illustrated in FIG. 2 comprises charged toner conveyor 70 including a base member 72 supporting repeating groups of electrodes 74, 76 and 78 similar to those of FIG. 1. A pair of three-phase AC voltage sources 80 and 82 are provide for applying suitable voltages to the electrode groups. Two three phase generators are provided so their average potentials can be independently biased by a DC voltage source 84 to supply the desired tangential field for producing a uniform field perpendicular to wave motion (i.e. parallel to the electrodes). As shown, the toner of one polarity is moved toward one end of the conveyor 70 while toner of the opposite polarity is moved in the opposite direction. We have labeled the charged toner separator of Figure 2 the cross-field separator whereas the separator of FIG. 1 has been labeled transfer separator.

Figure 3:
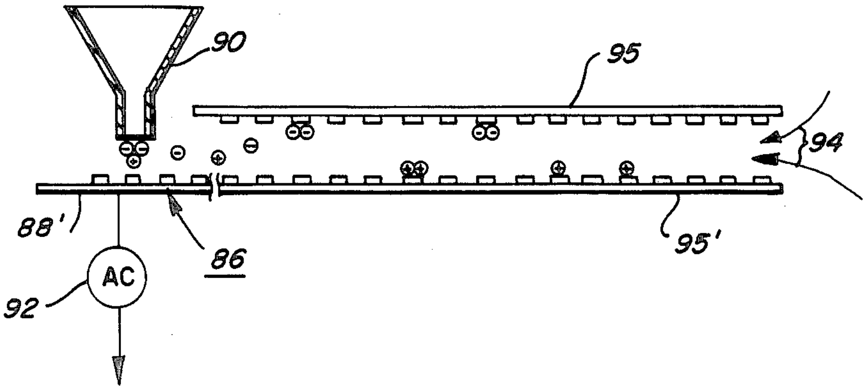
FIG. 3 is schematic illustration of a charged toner separator device in combination with a toner charging apparatus.

Disclosed in FIG. 3 is a toner charging device 86 that can be used with a charged toner separator similar to the one shown in FIG. 1. The toner charging device 86 comprises a high voltage charged toner conveyor 88 supported for receiving uncharged toner from a toner dispenser 90. The conveyor 88 is supplied with a relatively high voltage from source 92 which applies a voltage at a level sufficient to cause air ionization. The ions collect on the toner dispensed from the conveyor 88 whereby the toner particles are charged to a level sufficient for them to be transported and separated into positive and negative toner by a low voltage charged toner separator 94 similar to the separator 24. The separator comprise oppositely disposed low voltage toner conveyors 95 and 95[1]. Alternatively, a cross-field separator could be use in connection with the toner charging device 86.

Figure 4:
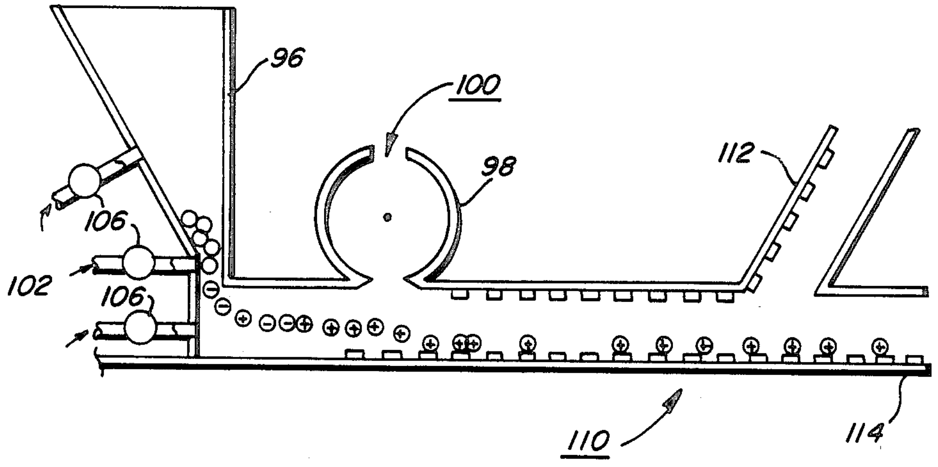
FIG. 4 is a schematic illustration of a modified embodiment of the combined toner charging and separating device of FIG. 3.

Disclosed in FIG. 4 is an modified form of the toner charging device of FIG. 3. As disclosed therein, uncharged toner from a toner hopper 96 is carried past a source 98 of ions by the use of an air source 100 which introduces air at greater than atmospheric pressure into the top inlet of the ion source 98 as well the air intake ports 102 of the toner hopper. The ions which are emitted from a corona discharge wire 104 are deposited on the toner as it is drawn past the ion source exit. The airflow is adjusted by bleed valves 106 to maintain approximately one full monolayer of toner moving a 50 to 100 cm/sec, as needed by the development system. The charged toner is then transported along a channel defined by opposed charged toner conveyors forming a charged toner separator 110 similar to the charged toner separator 17. The conveyors forming the separator are spaced approximately 0.010 to 0.0320 inch. The separator 110 has two branches 112 and 114, one for conveying toner of one polarity to a development zone and the other to a toner sump.

What is claimed is:

1. Printing apparatus including a toner delivery system, said toner delivery system comprising:
   means for separating a quantity of charged toner into it positively and negatively charged components prior to the presentation of the toner to a development zone, said separating means comprising charged toner conveyor structure including means for creating at least one electrostatic travelling wave pattern for effecting movement of said charged toner.

2. Printing apparatus according to claim 1 wherein said conveyor structure comprises a pair of charged toner conveyors.

3. Printing apparatus according to claim 2 including means for oppositely biasing said pair of conveyors to opposite polarities whereby charged toner of one polarity is attracted to one of said conveyors and charged toner of the opposite polarity is attracted to the other of said conveyors.

4. Printing apparatus according to claim 3 wherein the magnitude of the electrical bias on each of said conveyors is at a level such that toner below a certain charge level is not attracted to the respective conveyors.

5. Printing apparatus according to claim 1 wherein said charged toner conveyor structure comprises a single charged toner conveyor and means for causing toner of one polarity to move toward one end of said single charged toner conveyor and toner of the opposite polarity to move to the opposite end thereof.

6. Printing apparatus according to claim 5 wherein said means for causing toner of one polarity to move toward one end of said single charged toner conveyor and toner of the opposite polarity to move to the opposite end thereof comprises means for superimposing a uniform electrostatic field perpendicular to the wave motion of said single conveyor.

7. Printing apparatus according to claim 6 wherein said means for superimposing a uniform electrostatic field perpendicular to the wave motion of said single conveyor comprises means for applying a dc voltage to said at least one single conveyor.

8. Printing apparatus according to claim 7 wherein said at least one single conveyor comprises a pair of three-phase AC voltage sources which are independently biased by said means for applying a DC voltage.

9. Printing apparatus according to claim 2 including means for charging uncharged toner and moving it to said conveyor structure.

10. Printing apparatus according to claim 9 wherein said toner charging means comprises air ionization means for generating ions for charging said toner.

11. Printing apparatus according to claim 10 wherein said air ionization means comprises a high voltage toner conveyor.

12. Printing apparatus according to claim 9 wherein said means for charging uncharged toner comprises a corona discharge device.

13. Printing apparatus according to claim 12 including an air source for carrying toner from a toner hopper past said corona discharge device.

* * * * *